(12) United States Patent
Chang

(10) Patent No.: US 7,375,959 B2
(45) Date of Patent: May 20, 2008

(54) EXTERNAL DRIVE CABINET

(75) Inventor: Cheng-Chung Chang, Sijhih (TW)

(73) Assignee: SerComm Corporation, Taipei (TW)

( * ) Notice: Subject to any disclaimer, the term of this patent is extended or adjusted under 35 U.S.C. 154(b) by 417 days.

(21) Appl. No.: 11/093,213

(22) Filed: Mar. 29, 2005

(65) Prior Publication Data
US 2006/0171109 A1 Aug. 3, 2006

(30) Foreign Application Priority Data
Feb. 2, 2005 (TW) .............................. 94201919 U

(51) Int. Cl.
*G06F 1/16* (2006.01)
(52) U.S. Cl. .................. 361/685; 312/223.2; 312/333; 439/534
(58) Field of Classification Search ........ 361/679–686; 439/534; 312/223.1, 333; 369/75.11; 720/600
See application file for complete search history.

(56) References Cited
U.S. PATENT DOCUMENTS

| | | | | |
|---|---|---|---|---|
| 4,426,122 A * | 1/1984 | Lainez et al. ............... | 361/683 |
| 5,572,402 A * | 11/1996 | Jeong ......................... | 361/685 |
| 6,185,103 B1 * | 2/2001 | Yamada ...................... | 361/727 |
| 6,404,625 B1 * | 6/2002 | Chen et al. ................. | 361/683 |
| 6,580,603 B1 * | 6/2003 | Resnick ...................... | 361/683 |
| 6,798,651 B2 * | 9/2004 | Syring et al. ............... | 361/685 |
| 6,888,727 B2 * | 5/2005 | Chang ........................ | 361/752 |
| 6,922,336 B2 * | 7/2005 | Barsun et al. .............. | 361/683 |
| 6,985,355 B2 * | 1/2006 | Allirot ........................ | 361/683 |
| 2002/0151226 A1 * | 10/2002 | Boe ............................ | 439/686 |
| 2003/0151891 A1 * | 8/2003 | Paul ........................... | 361/686 |
| 2004/0100761 A1 * | 5/2004 | Liu ............................. | 361/685 |
| 2005/0243506 A1 * | 11/2005 | Robertson et al. .......... | 361/685 |

* cited by examiner

*Primary Examiner*—Jayprakash N Gandhi
*Assistant Examiner*—Anthony Q Edwards

(57) ABSTRACT

An external drive cabinet is provided with, a power connector and a data interface connector installed on the back side of the cabinet frame not on the same level but positioned in step manner, keeping a buffer space in between. Such arrangement of connectors enables one of the two connectors to make connection before the other does, thus smoothing out the plugging and unplugging processes. The tray in the external drive cabinet is equipped with a hinge joint at the rear end that is able to swing the front end of the tray upward when the handle bar of the tray is pulled up. The front panel of the hard disk stored in the drive cabinet can be completely concealed in the drive cabinet.

9 Claims, 8 Drawing Sheets

EXTERNAL DRIVE CABINET

BACKGROUND OF THE INVENTION

1. Field of the Invention

The present invention relates to an external drive cabinet, and in particular to a drive cabinet that allows a computer to process the data stored in the external disk drive through cable connection between the drive cabinet and the computer.

2. The Related Art

The computer operation is vulnerable to natural and human-caused hazards, such as computer viruses, lightning, and improper operation procedures on the part of the users, all of which can result in loss of valuable data during the operation.

Therefore, it is necessary to keep second copies of the original data in order to prevent data loss. Data can be stored in magnetic disks, CDs, or hard disks. Thanks to the cost-effective solution, the hard disk is still considered as the most important data storage device in computer data processing. To cope with increasing demand for second disks or removable disks, manufacturers put out external drive cabinets to hold the removable disks. The removable disk enables the users to carry their data on their business trips, and data transportation between the office and home.

There are basically two types of external disk drives on the market: standard and multi-function. The standard type is equipped with a universal serial bus (USB) interface, through which the power and data are transmitted to the enclosed hard disk. The multi-function type not only has USB interface, but also creates network drives with high-speed file transfer rate. This allows external disk drives to be directly connected to the computer for on-line data processing, so that multi-media and video applications can be supported, but this multi-functional external disk drive is larger in size and usually comes with a power connector and a data interface connector.

A conventional multi-function external disk drive is comprised of a frame, a cartridge, and a hard disk, where the control circuitry and heat fans are embedded in the drive frame, and a power connector and a data connector are provided at the back of he drive frame. The most common external disk drive comes with a push-pull handle.

The hard disk is normally inserted into the external drive cabinet by pushing in the cartridge holding the hard disk with the power and data connection from the backside of the hard disk and the cartridge. To dismount the hard disk, the cartridge is simply pulled out from the external drive cabinet. It shall be noted that the front panel of the hard disk is usually exposed on the outside even when the disk body is mounted in the external drive cabinet.

However, the mounting and dismounting of the hard disk in a conventional external drive cabinet is usually not that smooth. The power and data connections of the hard disk are arranged side by side at the back of the disk drive and on the same level. Similar configuration is also found on the external drive cabinet, so the connection between the hard disk and the drive cabinet might be so tight that it may take several attempts before the user can yank the hard disk out. The design problem causes the friction of connector walls to culminate at one point, so the force required to separate all connectors at one point is many times greater than a single connector. After removing the hard disk, the connectors or wire connections to the hard disk might be damaged by the sudden jolt.

To overcome the above-mentioned problems, the present invention intends to provide an improved external drive cabinet that makes mounting/dismounting of the hard disk easier.

SUMMARY OF THE INVENTION

The primary object of the present invention is to provide an external drive cabinet that enables the hard disk to be completely concealed in the drive cabinet, and allows the hard disk to be easily mounted or replaced by means of a swivel tray.

The secondary object of the present invention is to provide an external drive cabinet that allows the connectors at the back of the drive cabinet to be fitted with the hard disk in step-like manner, using a uniquely designed buffer space between the power connector and data interface connector, whereas in the conventional drive cabinet the power connector and data interface connector are all on the same level. This steplike arrangement of the power connector and data interface connector is intended to smooth out the plugging process in mounting the hard disk by allowing multiple disk connectors to be connected in series, or vice versa in dismounting, so as to reduce the friction involved.

The external drive cabinet in accordance with the present invention is partially enclosed by a frame with an opening on top and a central enclosure which is used to receive a tray with one hinge on the rear end of each side wall, and a shutter plate. The two hinges on the opposite side walls are to be fitted into corresponding hinge holes on the cabinet frame to create a hinged joint for the tray.

The frame also has a power switch, connectors, and LED lamps installed therein. The power socket and data interface socket are provided on the rear end.

The tray is formed with two side walls and a bottom, and a push-pull handle connected across the front end, and a tie plate across the middle section connecting the two side walls, leaving the rest of the tray open for improved air flow.

The handle bar is used to pull up or push down the tray in mounting/dismounting the disk drive. The handle bar also forms the mouth of the tray through which a hard disk can be inserted into the drive cabinet.

To open up the external drive cabinet, the tray is pulled up to have the front end of the tray tilted upward by the hinge action, so that a new disk can be mounted by sliding the disk downward along the guide pins until the connectors are mated on the back side. To close the external drive cabinet, the tray is pushed down to allow the tray to be lowered into the enclosure of the frame, and then the shutter plate is placed over the tray to have the disk drive completely concealed inside the drive cabinet.

In accordance with the present design, the data interface connector and power connector are installed on the backside of the cabinet frame. The data interface connector is connected by flat cable to the circuit board embedded in the bottom of the frame. The unique feature is that the data interface connector is positioned slightly in front of the power connector, separated by a buffer space, that gives the data interface connector a certain flexibility range, where the power connector is connected by a power cable to the circuit board. It shall be noted that the power connector and data interface connector are arranged side by side at the back of the frame, as is the conventional design.

To mount the hard disk into the external drive cabinet, the handle bar is pulled up. The front end of the tray is tilted upward to allow the hard disk to slide down to the rear end of the tray, where the data interface connector of the drive cabinet is first to contact the data interface socket of the hard disk and make connection. After that, as the hard disk continues to slide downward, the power connector of the drive cabinet is to make connection with the power socket of the hard disk.

Conversely, to dismount the hard disk in the external drive cabinet, the handle bar is pulled up again. But this time the power connector of the drive cabinet is the first one to be separated from the power socket of the hard disk, and then the data interface connector of the drive cabinet is disconnected from the data interface socket of the hard disk, so at this point the hard disk is completely detached from the drive cabinet.

The present design of the external drive cabinet is more advantageous in that: (1) better protection as the hard disk is completely concealed, (2) easy mounting and dismounting of hard disk aided by the swivel tray, without using screws; and (3) uniquely designed connectors in steplike manner are able to reduce the friction involved.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
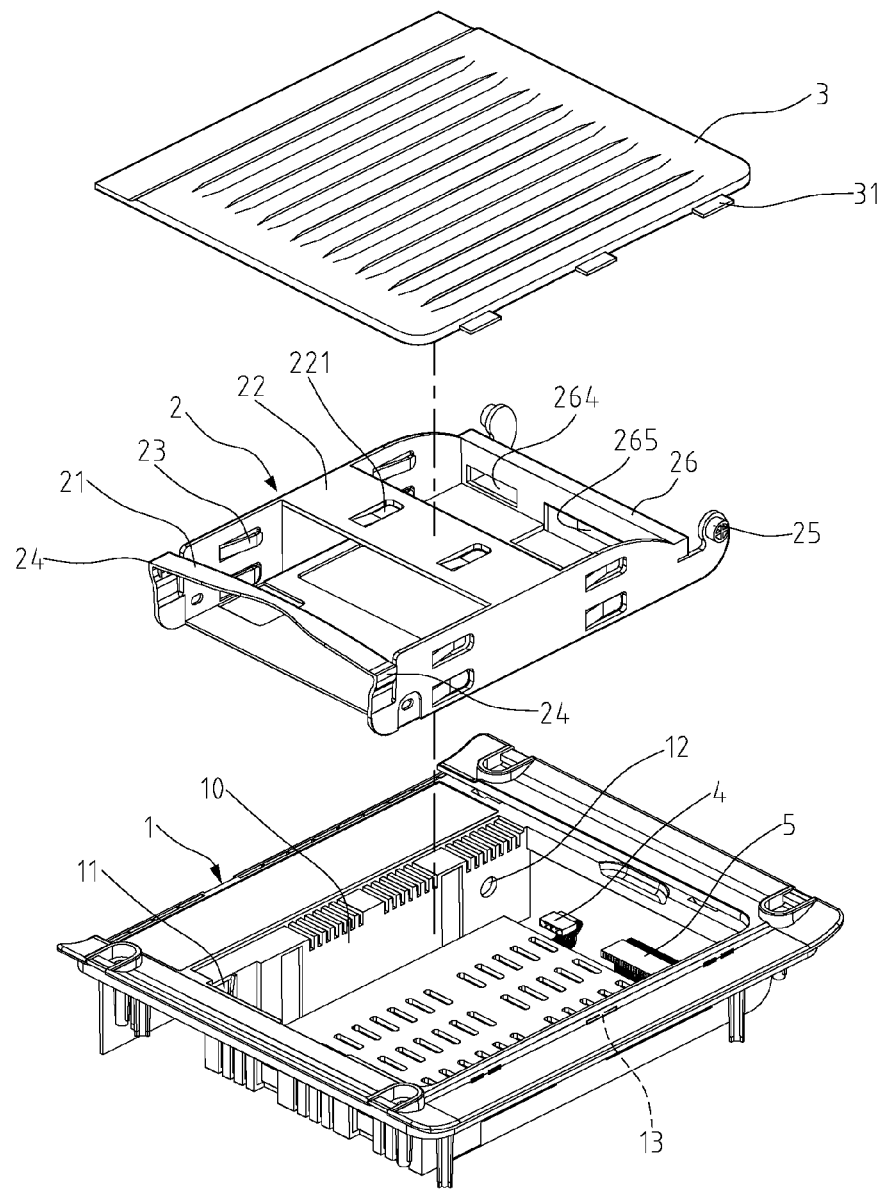
FIG. 1 is an exploded view of the external drive cabinet in accordance with the present invention.

Referring to FIG. 1, the external drive cabinet in accordance with the present invention comprises a frame 1, a tray 2, and a shutter plate 3, wherein the frame 1 has an opening on top and a rectangular enclosure 10 in the center partially enclosed by two side walls and a bottom, and the frame has a power connector 4 and a data interface connector 5 installed on the back side which are electrically linked to the circuit board built into the bottom of the frame 1 (not shown in diagrams).

Figure 7:
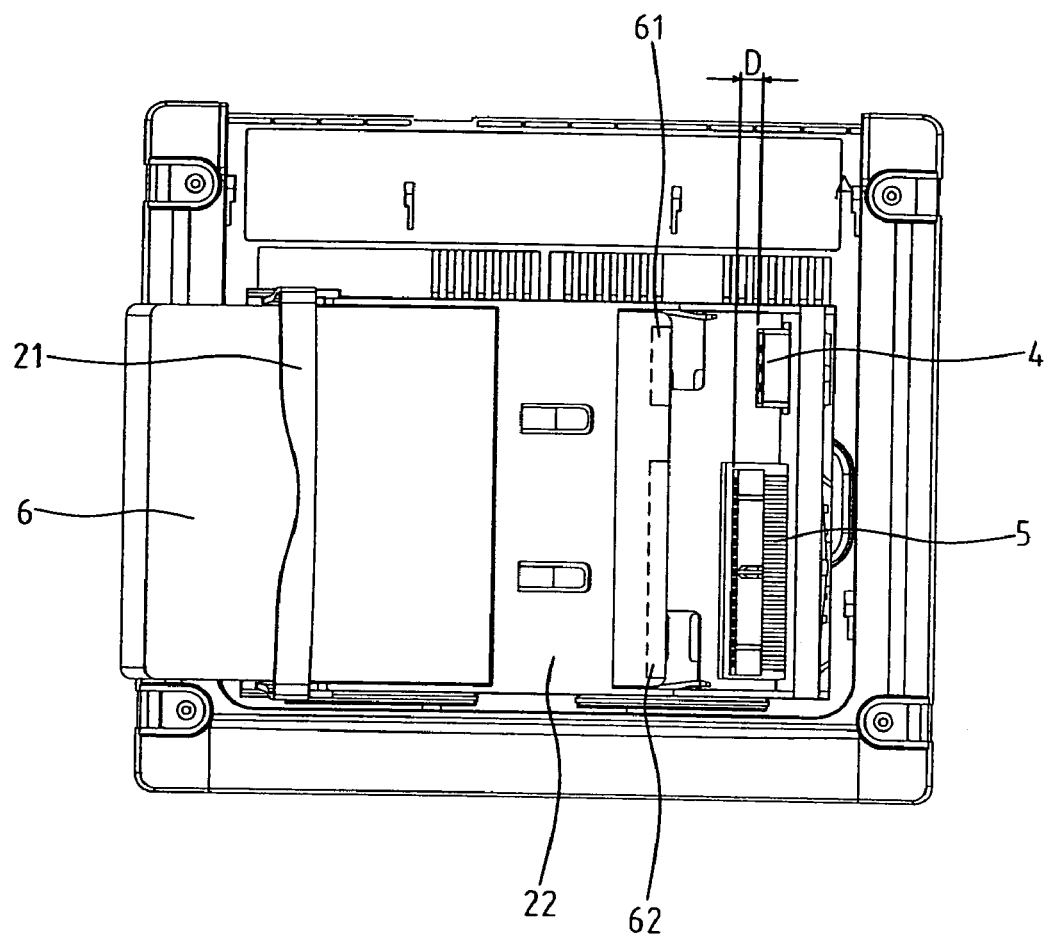
FIG. 7 is a top view of the hard disk being inserted into the tray of the external drive cabinet with the power and data interface connectors aligned for step connection.
Figure 8:
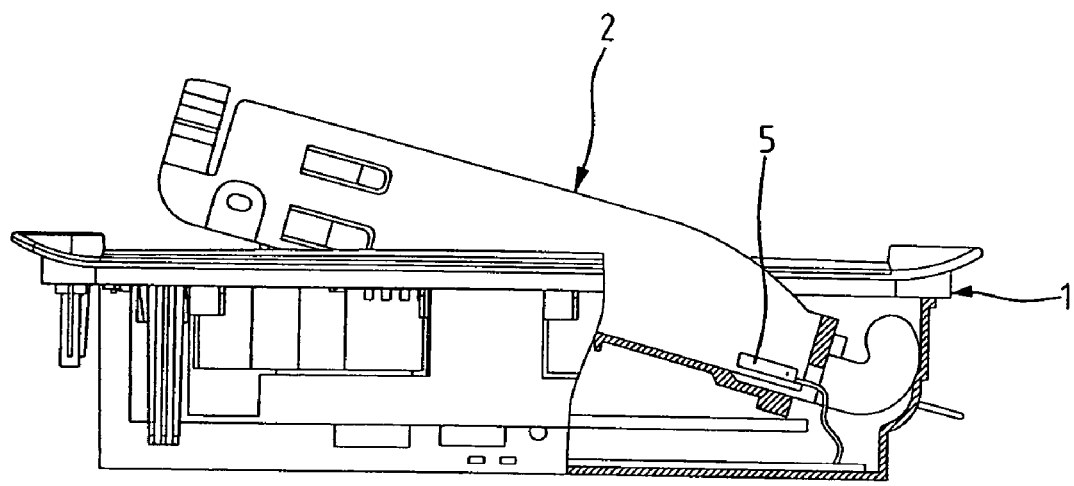
FIG. 8 is a side view showing the position of connectors at the back of the drive cabinet which are extended into the tray through the back opening.

The power connector 4 and data interface connector 5 are installed side by side on the backside of the drive frame 1. The data interface connector 5 is positioned slightly in front of the power connector 4 with a buffer space D between the power connector 4 and data interface connector 5 reserved for step-like connection, as shown in FIGS. 7 and 8.

The external wall of the cabinet frame 1 not only has the power connector 4 and data interface connector 5, but also LED indicators, ventilation holes, push button, USB connector, power switch, and network interface connector (though not shown in diagrams).

Still referring to FIG. 1, each side wall of the cabinet frame 1 has a corresponding hinge hole 12 near the back side for fitting a hinge 25 fixed on the rear end of the tray 2, and a corresponding mount hole 11 near the front side used to secure the tray 2.

The cabinet frame 1 also has a series of slots 13 near the upper rim of sidewalls for heat ventilation. The structure of the cabinet frame 1 is U-shaped with the backside open. To further improve the ventilation effect, preferably, a heat fan may be installed (not shown in the diagram).

The tray 2 made with plastic material is used to hold the hard disk 6 as shown in FIGS. 2-6. The tray 2 has a handle bar 21 across the front end, two side walls, and a tie plate 22 over the middle section to connect the two side walls, and a bottom, leaving the rest of the tray 2 open for improved ventilation. The handle bar 21 is preferably a flexible band integrated into the structure of the tray 2, which can be pre-fabricated.

The handle bar 21 has two bumps 24 on the opposite corners extending outward, used to secure the tray 2 in the cabinet frame 1 when the tray 2 is lowered into the cabinet frame 1. As can be seen from FIG. 1, the tray 2 has a back wall 26 formed with an opening 264 for receiving the power connector 4 and another opening 265 for receiving the data interface connector 5.

Figure 2:
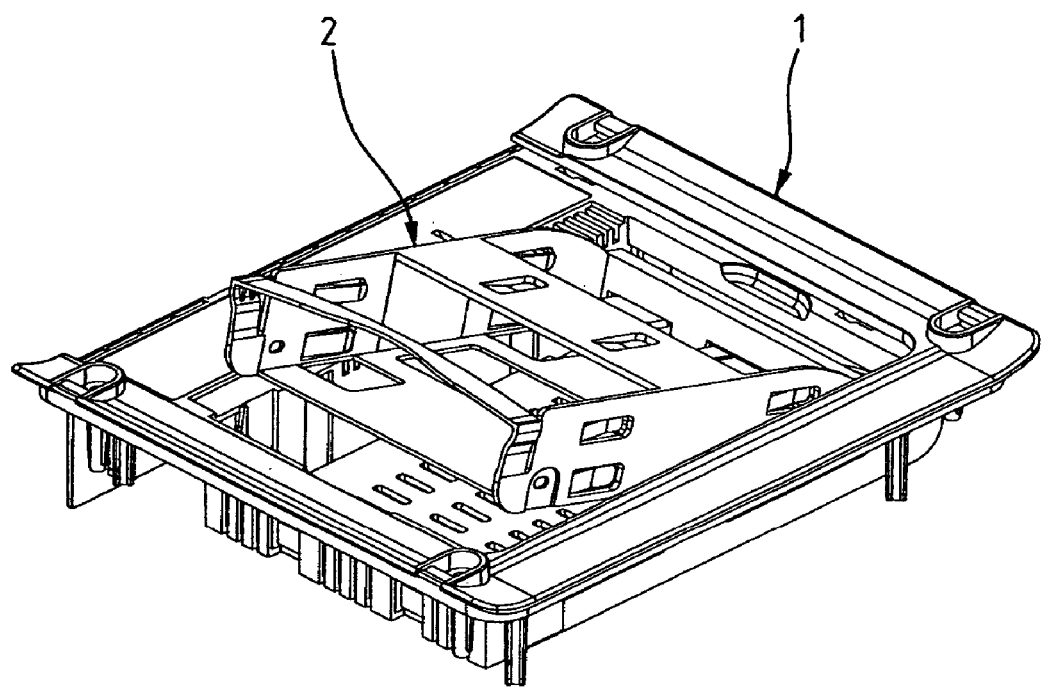
FIG. 2 is an isometric view of the external drive cabinet from the front end.
Figure 3:
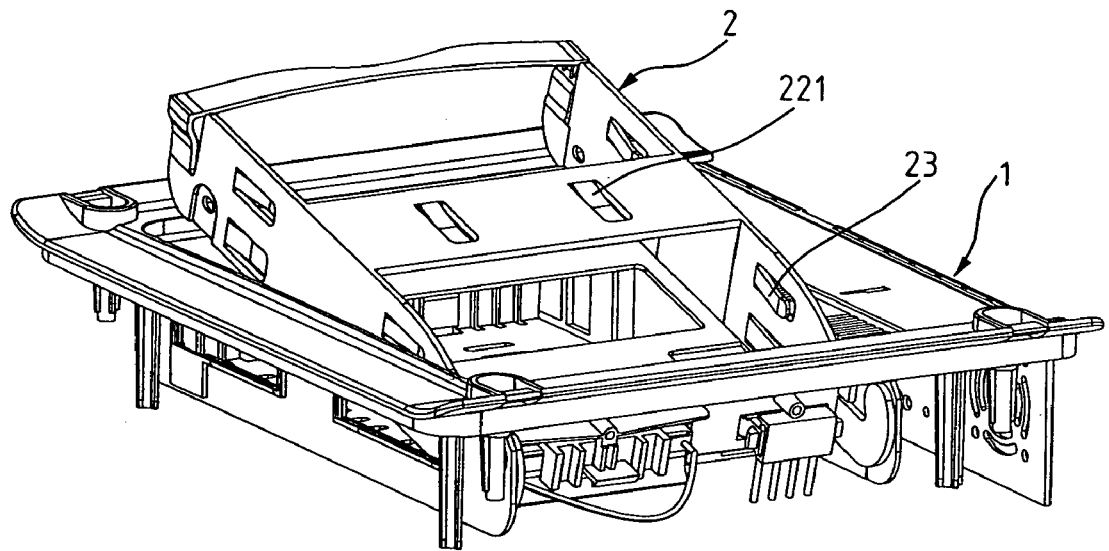
FIG. 3 is an isometric view of the external drive cabinet from the rear end.

Each side wall of the tray 2 has a hinge 25 fixed on the rear end for fitting into corresponding hinge hole 12 on the cabinet frame 1, so the two hinges 25 on opposite walls of the tray 2 create a hinged joint to allow the front end of the tray 2 to be tilted upward by the hinge action as shown in FIGS. 2 and 3.

Referring to FIG. 3, the tray 2 has a plurality of guide pins 23 on the inner surface of the side walls, and the tie plate 22 also has two guide pins 221 on the lower surface, all used to guide the hard disk during mounting or dismounting, and to hold the hard disk in place after the tray 2 is lowered into the enclosure 10 of the cabinet frame 1. The guide pins 23/221 are preferably integrated into the structure of the sidewall and tie plate which can be pre-fabricated.

The shutter plate 3 is a flat rectangular plate with a plurality of inserters 31 on the outer rim to be fitted into corresponding slots 13 near the upper rim of the cabinet frame 1. The shutter plate 3 is used to cover the enclosure 10 and protect the hard disk 6 from the external environment.

It is noteworthy that the power connector 4 and data interface connector 5 are installed in step manner at the back of the cabinet frame 1, as shown in FIGS. 7, 8. The data interface connector 5 is slightly in front of the power connector 4 with a buffer space D (or differential height), and is connected by a flat cable with appropriate flexibility, so the data interface connector 5 has a flexibility range as the data interface connector 5 is being plugged into the data interface socket 62. Such connector design allows the data interface connector 5 to make connection before the power connector 4 does, so as to reduce the friction involved.

Figure 4:
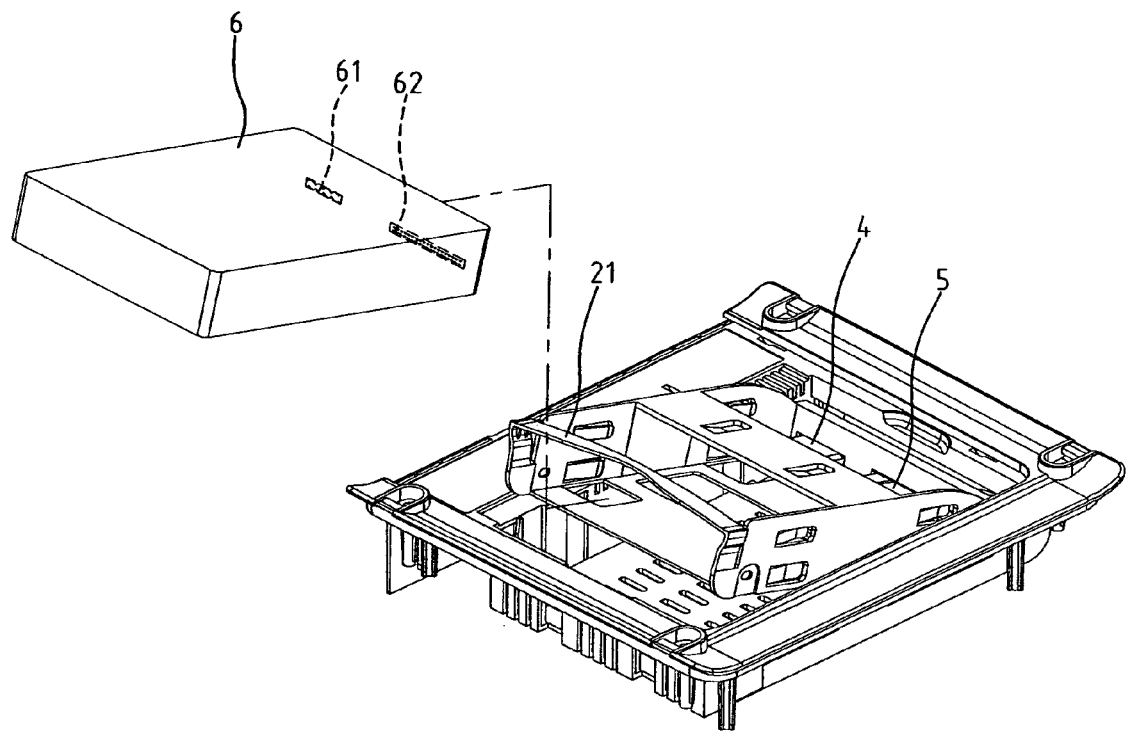
FIG. 4 is a conceptual diagram of the hard disk to be inserted into the external drive cabinet with the tray tilted upward.
Figure 5:
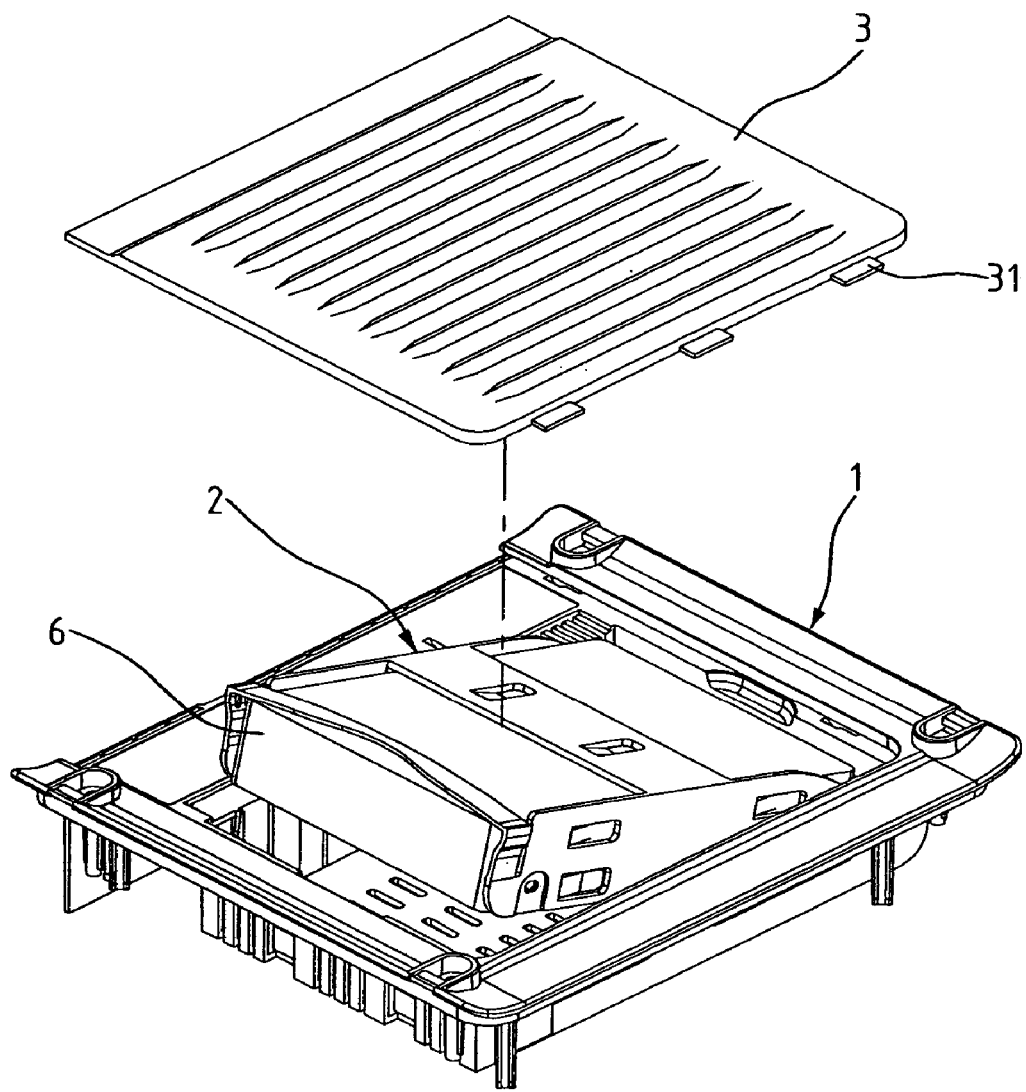
FIG. 5 is another diagram with a hard disk just inserted into the tray of the external drive cabinet.

With regard to the manner of operation, to mount the hard disk into the external drive cabinet, the handle bar 21 is pulled up to enable the front end of the tray 2 to be tilted upward by the hinge action as shown in FIG. 4, and then the hard disk 6 is inserted through the mouth of the tray 2 as shown in FIG. 5, and then the hard disk 6 is gently pushed to allow the disk to slide downward toward the back side of the tray 2, where the power socket 61 and data interface socket 62 on the back side of the hard disk 6 are successively mated with the power connector 4 and data interface connector 5 of the cabinet frame 1.

Figure 6:
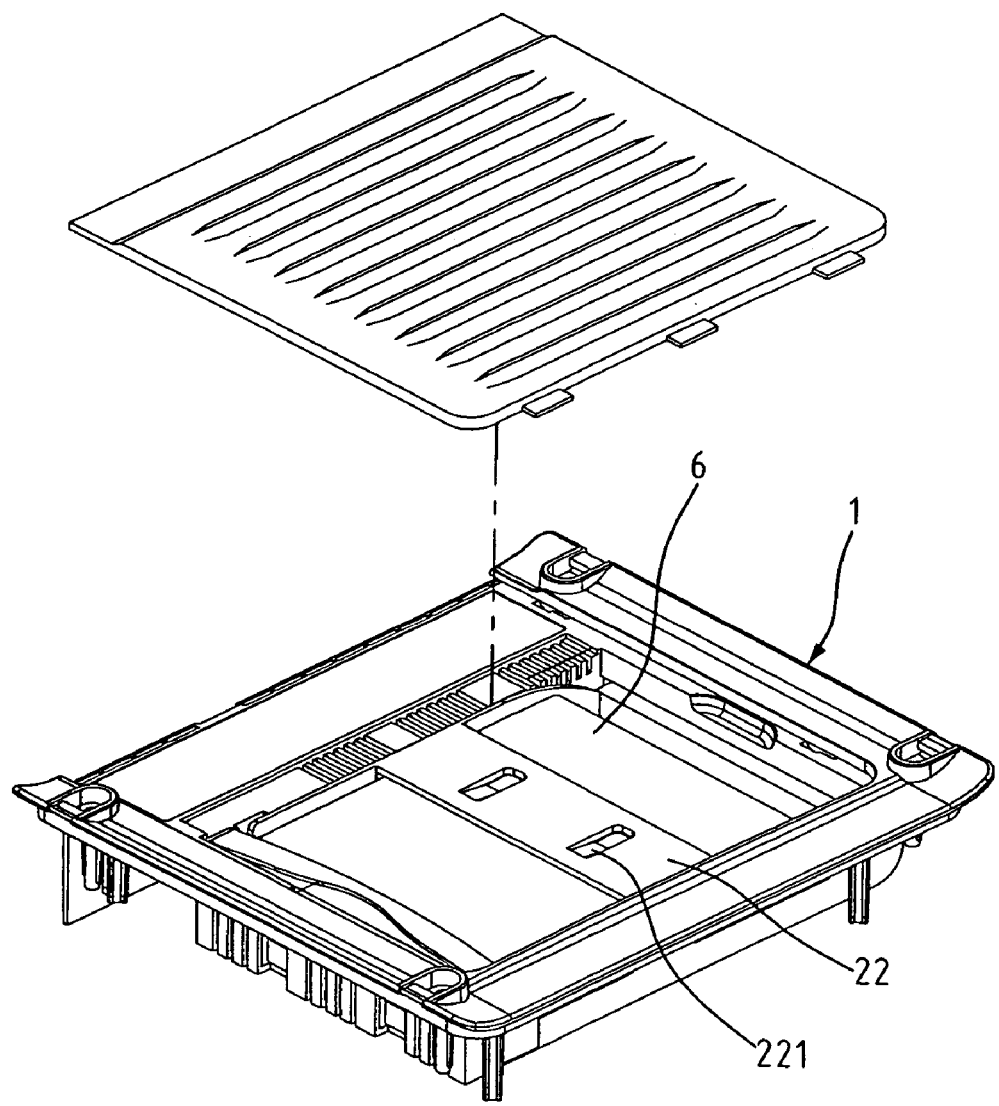
FIG. 6 is still another diagram of the external drive cabinet with the hard disk and tray laid flat in the enclosure of the cabinet frame.

Thereafter, the tray 2 is lowered into the enclosure 10 as shown in FIG. 6, so that the tray 2 and hard disk 6 are laid flat in the enclosure 10 with the top surface of the tray 2 slightly below the top edge of the cabinet frame 1. The two bumps 24 on the outer corners of the handle bar 21 are respectively lodged into the mount holes 11 on the frame wall, and the guide pins 23/221 hold helds the hard disk 6 in place in the horizontal orientation, and then the shutter plate 3 is placed over the tray 2 to finish the disk mounting process.

To dismount the hard disk, the handle bar 21 is again pulled up to enable the front end of the tray 2 to be tilted upward similar to the mounting of the hard disk previously mentioned, but the rest of the process is reversed. After all, the operation can be very simple for an average user. Thus, the present invention enables the hard disk to be mounted or dismounted more smoothly without using screws.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An external drive cabinet comprising:
   a cabinet frame partially enclosed with an opening on top and a rectangular enclosure in the center of the cabinet frame, and a power connector and a data interface connector installed side by side on the back side of the cabinet frame;
   a tray made with plastic to hold a hard disk, the tray having two side walls, a back wall and a bottom, wherein the tray has a horizontal tie plate over a middle section to connect the two side walls, and a handle bar across the front end of the tray to form a mouth opening; and movement of the tray is controlled by a hinged joint at the back end of the tray; and
   a shutter plate which is used to cover the tray from outside environment;
   wherein the back wall of the tray has an opening for receiving the power connector and another opening for receiving the data interface connector which is positioned slightly in front of the power connector, and the data interface connector is connected by a flexible flat cable to a circuit board embedded in the bottom of the cabinet frame so that the data interface connector is allowed to move with certain flexibility when a data interface socket of the hard disk is coupled with the data interface connector.

2. The external drive cabinet as claimed in claim 1, wherein the side walls of the tray have a plurality of guide pins facing each other on the inner surface of the side walls which are used to guide the hard disk during mounting and dismounting.

3. The external drive cabinet as claimed in claim 2, wherein the guide pins are integrated into the structure of the side walls of the tray.

4. The external drive cabinet as claimed in claim 2, wherein each side wall of the tray has a hinge on the rear end of the side wall, which is to be fitted into a corresponding hole on the wall of the cabinet frame to form the hinged joint to control the swing of the tray.

5. The external drive cabinet as claimed in claim 1, wherein the handle bar is a flexible band integrated into the structure of the tray.

6. The external drive cabinet as claimed in claim 5, wherein the handle bar has two bumps on two opposite corners extending outward to be fitted into corresponding mount holes on the cabinet frame to hold the tray in place.

7. The external drive cabinet as claimed in claim 1, wherein the tie plate has a plurality of guide pins on the lower surface of the tie plate.

8. The external drive cabinet as claimed in claim 7, wherein the guide pins are integrated with the structure of the tie plate of the tray.

9. The external drive cabinet as claimed in claim 1, wherein the shutter plate has a plurality of inserters on the outer rim of the shutter plate to be fitted into corresponding slots near the upper rim of the cabinet frame.

* * * * *